(12) United States Patent
Uehara

(10) Patent No.: US 7,753,602 B2
(45) Date of Patent: Jul. 13, 2010

(54) LENS BARREL

(75) Inventor: Takumi Uehara, Tokyo (JP)

(73) Assignee: Canon Kabushiki Kaisha (JP)

( * ) Notice: Subject to any disclaimer, the term of this patent is extended or adjusted under 35 U.S.C. 154(b) by 384 days.

(21) Appl. No.: 11/782,921

(22) Filed: Jul. 25, 2007

(65) Prior Publication Data

US 2008/0025719 A1    Jan. 31, 2008

(30) Foreign Application Priority Data

Jul. 31, 2006    (JP)    ................ 2006-208647

(51) Int. Cl.
*G03B 9/10*    (2006.01)
(52) U.S. Cl. .................................... 396/493
(58) Field of Classification Search ......... 396/448–449, 396/452–453, 493
See application file for complete search history.

(56) References Cited

U.S. PATENT DOCUMENTS

| | | | | |
|---|---|---|---|---|
| 5,486,889 | A * | 1/1996 | Shintani | .............. 396/448 |
| 6,443,634 | B1 * | 9/2002 | Tsuboi | .............. 396/448 |
| 2005/0025476 | A1 * | 2/2005 | Onda | .............. 396/448 |
| 2005/0053372 | A1 * | 3/2005 | Hase | .............. 396/448 |
| 2006/0024049 | A1 * | 2/2006 | Ichino | .............. 396/448 |
| 2006/0115249 | A1 * | 6/2006 | Mochinushi et al. | .......... 396/29 |
| 2007/0047951 | A1 * | 3/2007 | Tanaka et al. | .............. 396/448 |

FOREIGN PATENT DOCUMENTS

JP    07-159856 A    6/1995

* cited by examiner

*Primary Examiner*—W. B. Perkey
*Assistant Examiner*—Dennis Hancock
(74) *Attorney, Agent, or Firm*—Rossi, Kimms & McDowell LLP

(57) ABSTRACT

A lens barrel which enables cost reduction and size reduction by reduction of the number of component parts, and is capable of positively fully opening barrier blades to thereby open a photographic aperture. In the lens barrel, as the barrier drive member moves from a closing position to an opening position to cause the barrier blade to open, the amount of the charged spring force of the barrier drive spring progressively decreases. In a state where the barrier blade is constrained from moving in an opening direction, as the barrier drive member is moved toward the closing position, the amount of the charged spring force progressively increases. In a state where the barrier drive member is constrained from moving in a direction causing the barrier bladed to open, as the barrier blade is opened, the amount of the charged spring force progressively increases.

7 Claims, 15 Drawing Sheets

LENS BARREL

BACKGROUND OF THE INVENTION

1. Field of the Invention

The present invention relates to a lens barrel which is provided with barrier blades disposed in the front of a photographic optical system, for protecting a photographic lens and openably covering a photographic aperture.

2. Description of the Related Art

A conventional lens barrel of the above-mentioned type is disclosed e.g. in Japanese Laid-Open Patent Publication (Kokai) No. H07-159856.

The lens barrel is provided with a pair of barrier blades for openably covering a photographic aperture formed in the front of a photographic optical system, and the barrier blades are opened and closed by a barrier drive ring that rotates about the optical axis. A rotational force of a rotational barrel is transmitted to the barrier drive ring via a connecting shaft.

A barrier-closing spring is mounted between each of the barrier blades and the barrier drive ring. The barrier-closing spring always holds the associated barrier blade in contact with the barrier drive ring in a manner urging the barrier blade in the closing direction to thereby accommodate or absorb the motion of the barrier drive ring in a direction away from the barrier blades.

Further, between the barrier drive ring and a lens barrel cover, there is mounted a barrier-opening spring that urges the barrier drive ring to drive each of the barrier blades in the opening direction.

When the rotational barrel rotates in one direction, the rotational force of the rotational barrel is transmitted to the barrier drive ring via the connecting shaft, and the barrier drive ring rotates in the one direction while charging the barrier-opening spring.

At this time, each of the barrier blades is pressed by the associated barrier-closing spring to turn in the other direction according to the rotation of the barrier drive ring. As a consequence, the barrier blades are closed to cover the photographic aperture in the front of the photographic optical system.

On the other hand, when the rotational barrel rotates in the other direction, the rotational barrel is unhooked from the connecting shaft, and the barrier drive ring is rotated in the other direction by the charged spring force of the barrier-opening spring.

At this time, the barrier blades turn in the other direction according to the rotation of the barrier drive ring. As a consequence, the barrier blades are opened to open the photographic aperture in the front of the photographic optical system. Then, when fully opened, the barrier blades come into abutment with respective stoppers, whereby the pivotal motion of each of the barrier blades is restrained to stop the rotation of the barrier drive ring.

If some obstacle (e.g. foreign matter, such as sand) hinders the barrier blades from moving in the closing direction during their closing operation, the barrier-closing spring is charged by the barrier drive ring attempting to rotate in the one direction, whereby the rotation of the barrier drive ring in the one direction is allowed. In short, the barrier-closing spring permits the motion of the barrier drive ring in a direction away from the barrier blades. This prevents occurrence of a mechanical trouble.

As mentioned above, the lens barrel disclosed in Japanese Laid-Open Patent Publication (Kokai) No. H07-159856 requires the barrier-closing springs for accommodating the motion of the barrier drive ring away from the barrier blades when the motion of the barrier blades in the closing direction is blocked by some obstacle during the closing operation of the barrier blades.

For this reason, the two kinds of springs, i.e. the barrier-opening spring and the barrier-closing springs are required, which causes an increase in the number of component parts, resulting in increased manufacturing costs. Further, dedicated spaces for the barrier-closing springs are required, which hinders reduction of the size of the lens barrel.

Another problem is that the barrier drive ring is supported by being rotatably fitted on a shaft part, and between the barrier drive ring and the shaft part, there is created a radial clearance for ensuring smooth rotation of the barrier drive ring. Due to this arrangement, the barrier drive ring is always made eccentric from the shaft part by the urging force of the barrier-opening spring by an amount corresponding to the clearance, and hence when the pair of barrier blades operate to open or close the photographic aperture, a lag in timing for opening or closing the photographic aperture occurs between the operations of the respective barrier blades.

In such a case, if one of the barrier blades is fully opened and comes into abutment with the stopper to stop the rotation of the barrier drive ring, there can occur a problem that the other barrier blade is not fully opened.

SUMMARY OF THE INVENTION

The present invention provides a lens barrel which enables cost reduction and size reduction by reduction of the number of component parts and is capable of positively fully opening barrier blades to thereby open a photographic aperture.

The present invention provides a lens barrel comprising a barrier blade configured to openably cover a photographic aperture, a barrier drive member configured to move between a closing position for causing the barrier blade to close the photographic aperture and an opening position for causing the barrier blade to open the photographic aperture, thereby driving the barrier blade between a standby position for covering the photographic aperture and an image-taking position for opening the photographic aperture, and a barrier drive spring mounted between the barrier drive member and the barrier blade, wherein as the barrier drive member moves from the closing position to the opening position to cause the barrier blade to perform an opening operation, an amount of a charged spring force of the barrier drive spring progressively decreases, wherein as the barrier drive member is moved to the closing position, in a state in which the barrier blade is constrained from moving toward the closing position, the amount of the charged spring force of the barrier drive spring progressively increases in accordance with the movement of the barrier drive member, and wherein as the barrier blade is caused to perform the opening operation, in a state in which the barrier drive member is constrained from moving in a direction causing the barrier blade to move toward the opening position, the amount of the charged spring force of the barrier drive spring progressively increases in accordance with the opening operation of the barrier blade.

With the arrangement of the present invention, the barrier drive spring functions not only as a barrier-opening spring but also as a barrier-closing spring. Therefore, the number of component parts can be reduced, and hence it is possible to reduce manufacturing costs and assembling man-hours as well as to achieve reduction of the size of the lens barrel by space saving.

The barrier blade can comprise a pair of barrier blades, and the barrier drive spring can comprise a pair of barrier drive springs provided in association with the barrier blades, respectively.

The barrier blade comprises a pair of barrier blades, and a pair of barrier blade springs are provided in association with the barrier blades, respectively. Therefore, each of the barrier blade operates independently of each other to move the associated barrier blade in the opening direction. This makes it possible, even if the barrier drive member is eccentric, to positively fully open the barrier blades to thereby open the photographic aperture.

The barrier drive spring can be implemented by a tension coil spring, and the barrier drive member moves between the closing position and the opening operation by rotation, and causes the barrier blade to perform opening and closing operations, by being brought into contact with the barrier blade during the rotation to cause the barrier blade to rotate in accordance with the rotation.

When a distance from a rotational axis of the barrier drive member to a position of contact between the barrier drive member and the barrier blade is represented by L1, a distance from the rotational axis of the barrier drive member to a point of force application of the barrier drive spring on the barrier drive member is represented by L2, and a distance from a pivotal axis of the barrier blade to the position of contact between the barrier blade and the barrier drive member is represented by L3, and a distance from the rotational axis of the barrier blade to a point of force application of the barrier drive spring on the barrier blade is represented by L4, a relationship of L2×L3>L1×L4 is satisfied.

The barrier drive spring can be implemented by a torsion spring, and the barrier drive member moves between the closing position and the opening position by rotation, and causes the barrier blade to perform opening and closing operations by being brought into contact with the barrier blade during the rotation to cause the barrier blade to rotate in accordance with the rotation.

When a distance from a rotational axis of the barrier drive member to a position of contact between the barrier drive member and the barrier blade is represented by L1, a distance from the rotational axis of the barrier drive member to a point of force application of the barrier drive spring on the barrier drive member is represented by L2, and a distance from a pivotal axis of the barrier blade to the position of contact between the barrier blade and the barrier drive member is represented by L3, and a distance from the rotational axis of the barrier blade to a point of force application of the barrier drive spring on the barrier drive member is represented by L4, a relationship of L2×L3>L1×L4 is satisfied.

The barrier drive spring can be implemented by a tension coil spring, and the barrier drive member moves between the closing position and the opening operation by rotation, and causes the barrier blade to perform opening and closing operations, by being brought into contact with the barrier blade during the rotation to cause the barrier blade move linearly in accordance with the rotation.

When a distance from a rotational axis of the barrier drive member to a position of contact between the barrier drive member and the barrier blade is represented by L1, and a distance from the rotational axis of the barrier drive member to a point of force application of the barrier drive spring on the barrier drive member is represented by L2, a relationship of L2>L1 is satisfied.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
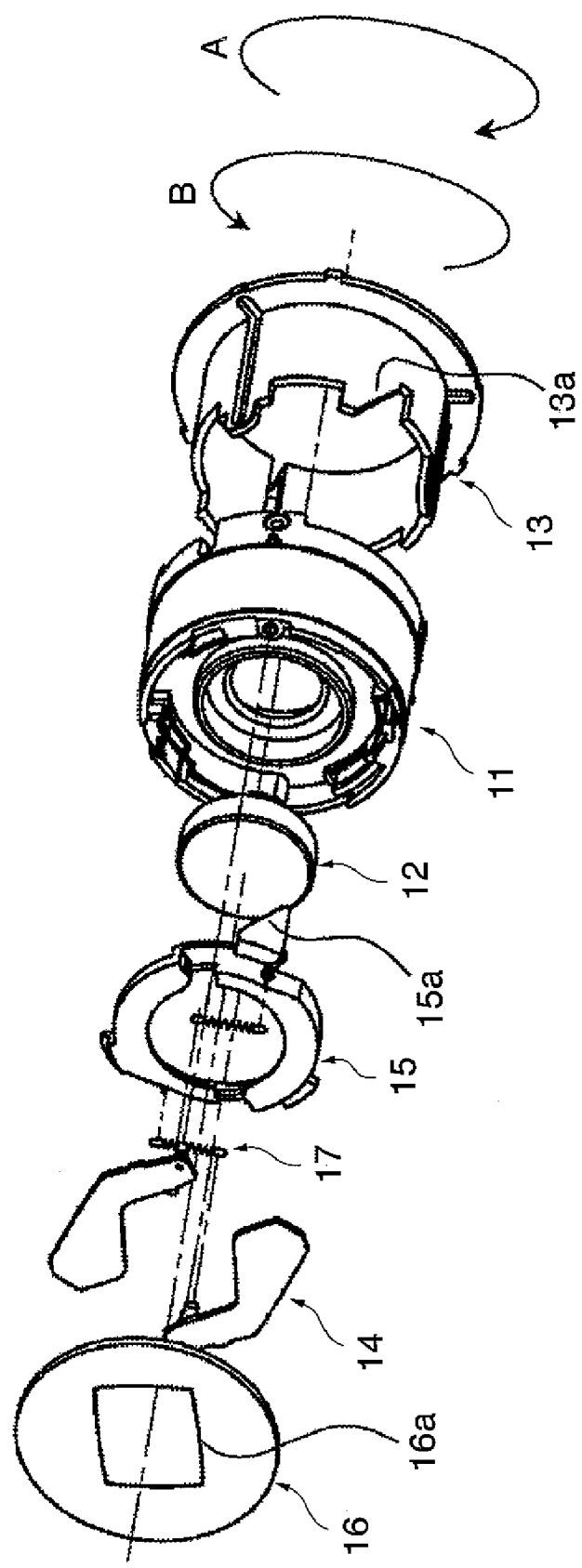
FIG. 1 is an exploded perspective view of a lens barrel according to a first embodiment of the present embodiment.
Figure 2:
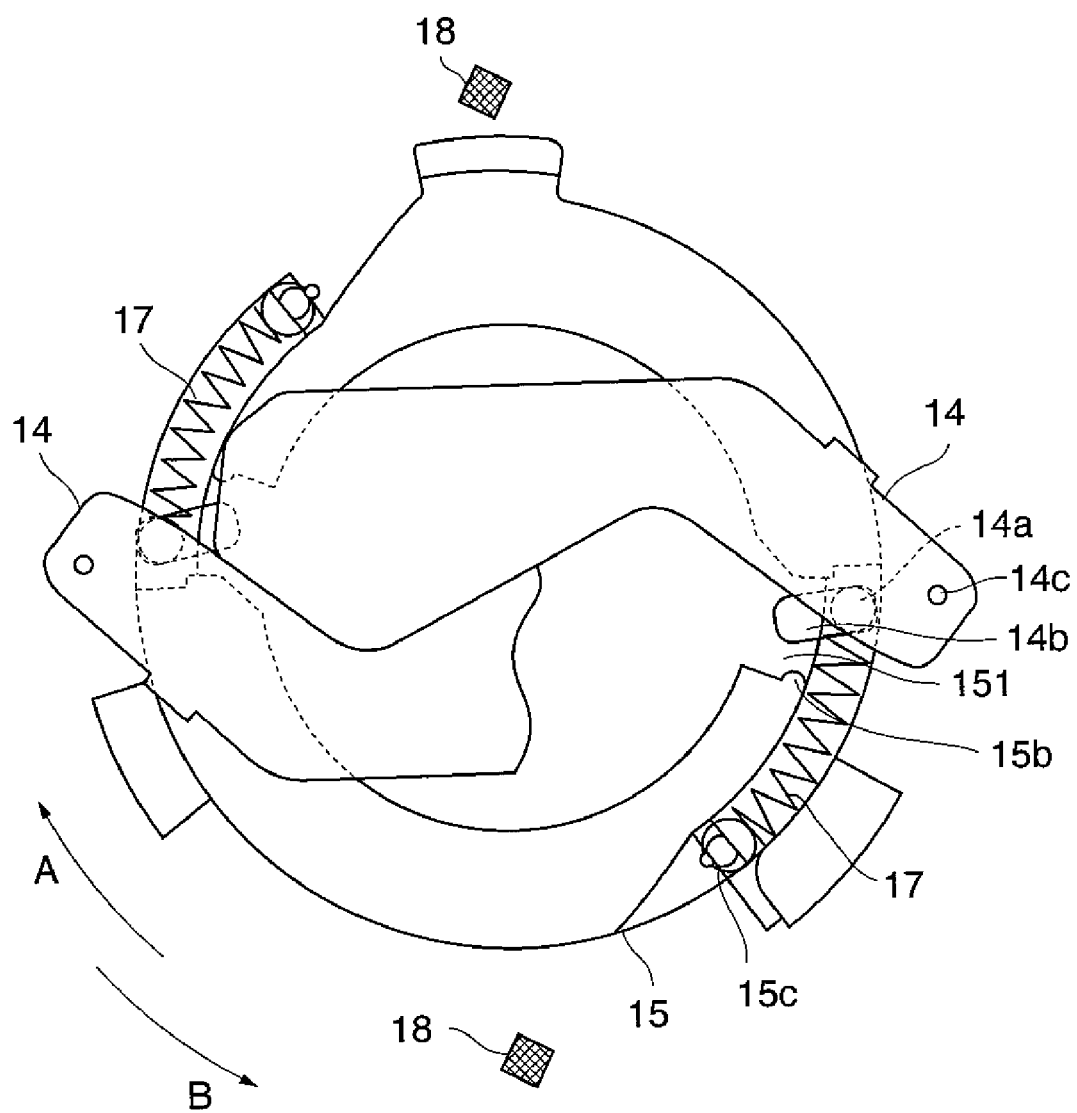
FIG. 2 is a view of barrier blades of the lens barrel in a fully closed state.
Figure 3:
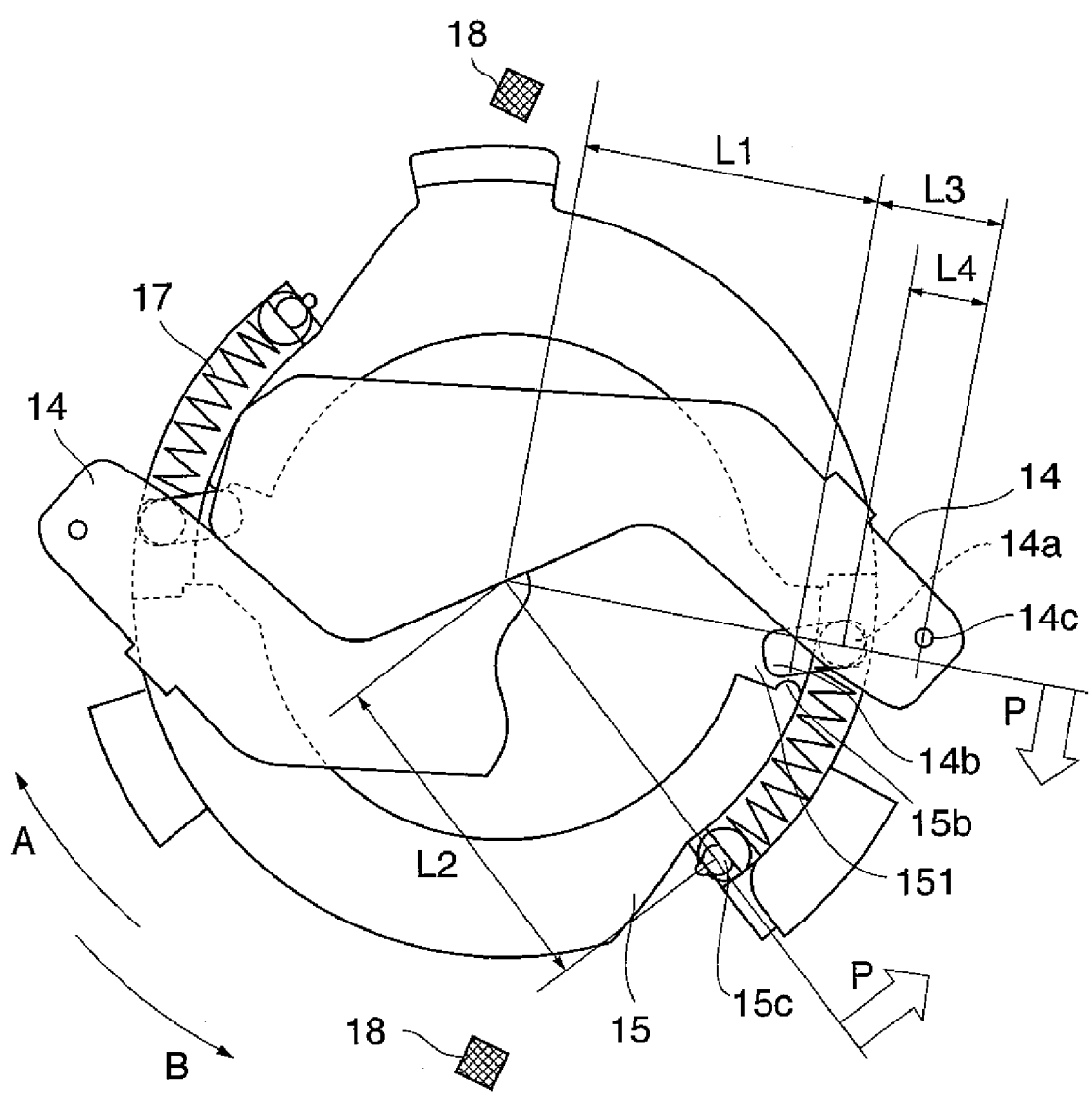
FIG. 3 is a view of the barrier blades of the lens barrel in a state started to open.
Figure 4:
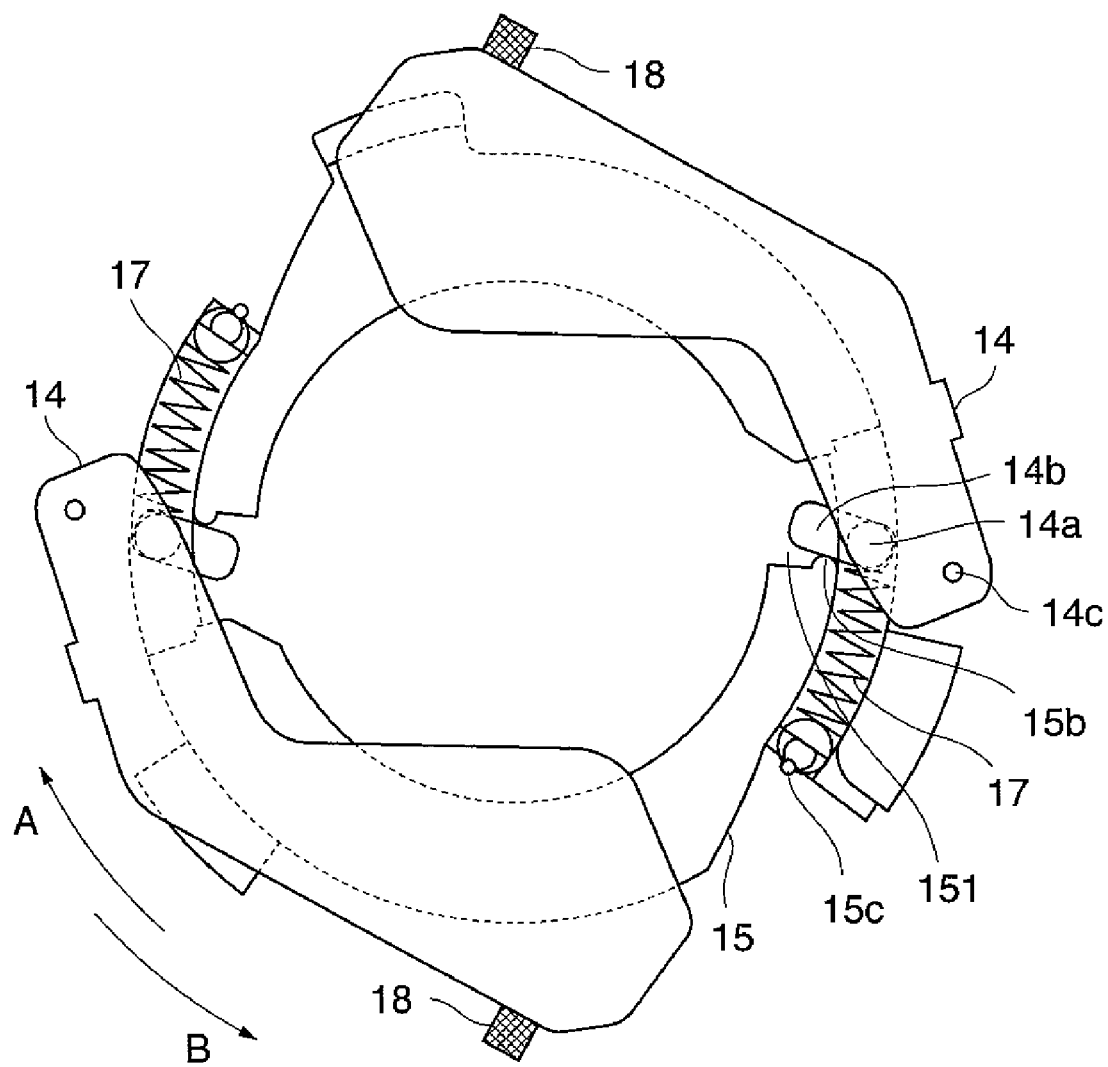
FIG. 4 is a view of the barrier blades of the lens barrel in a fully open state.
Figure 5:
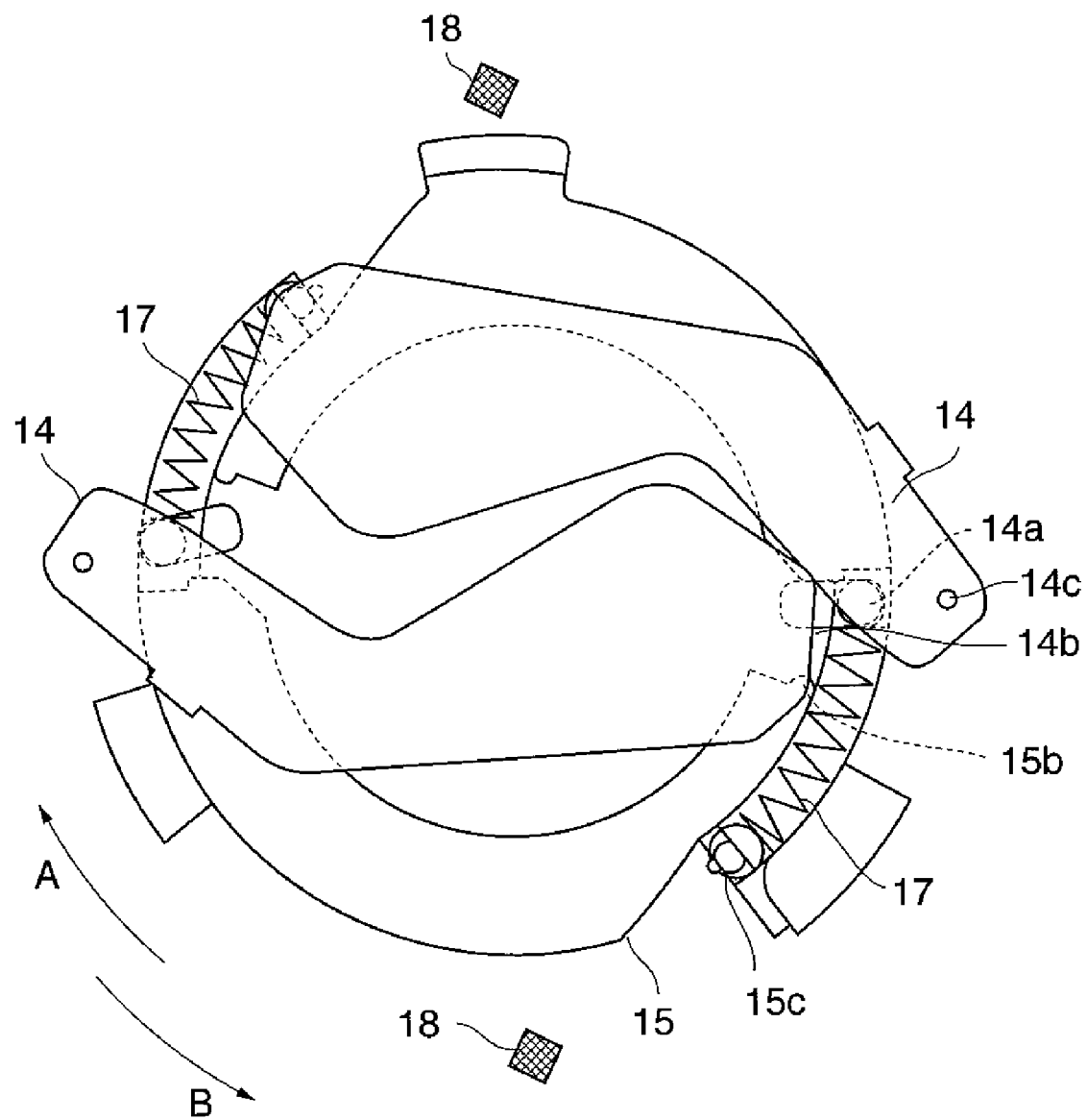
FIG. 5 is a view of the barrier blades of the lens barrel in a forcibly opened state.
Figure 6:
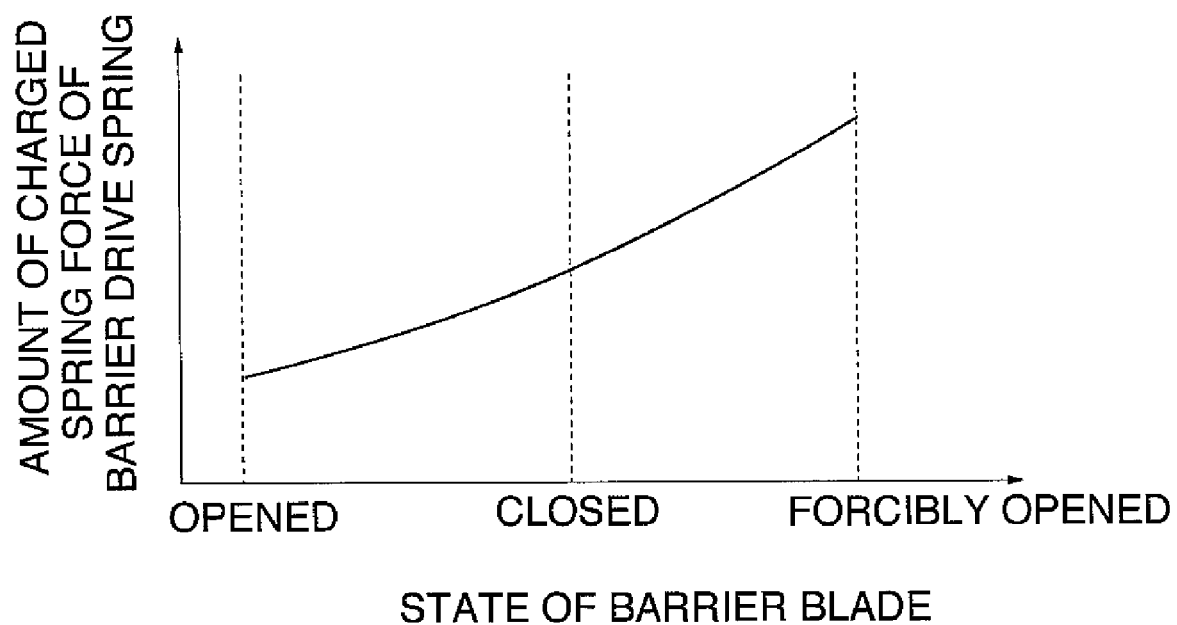
FIG. 6 is a graph showing the relationship between the open and closed states of the barrier blade and the amount of the charged spring force of a barrier drive spring.
Figure 7:
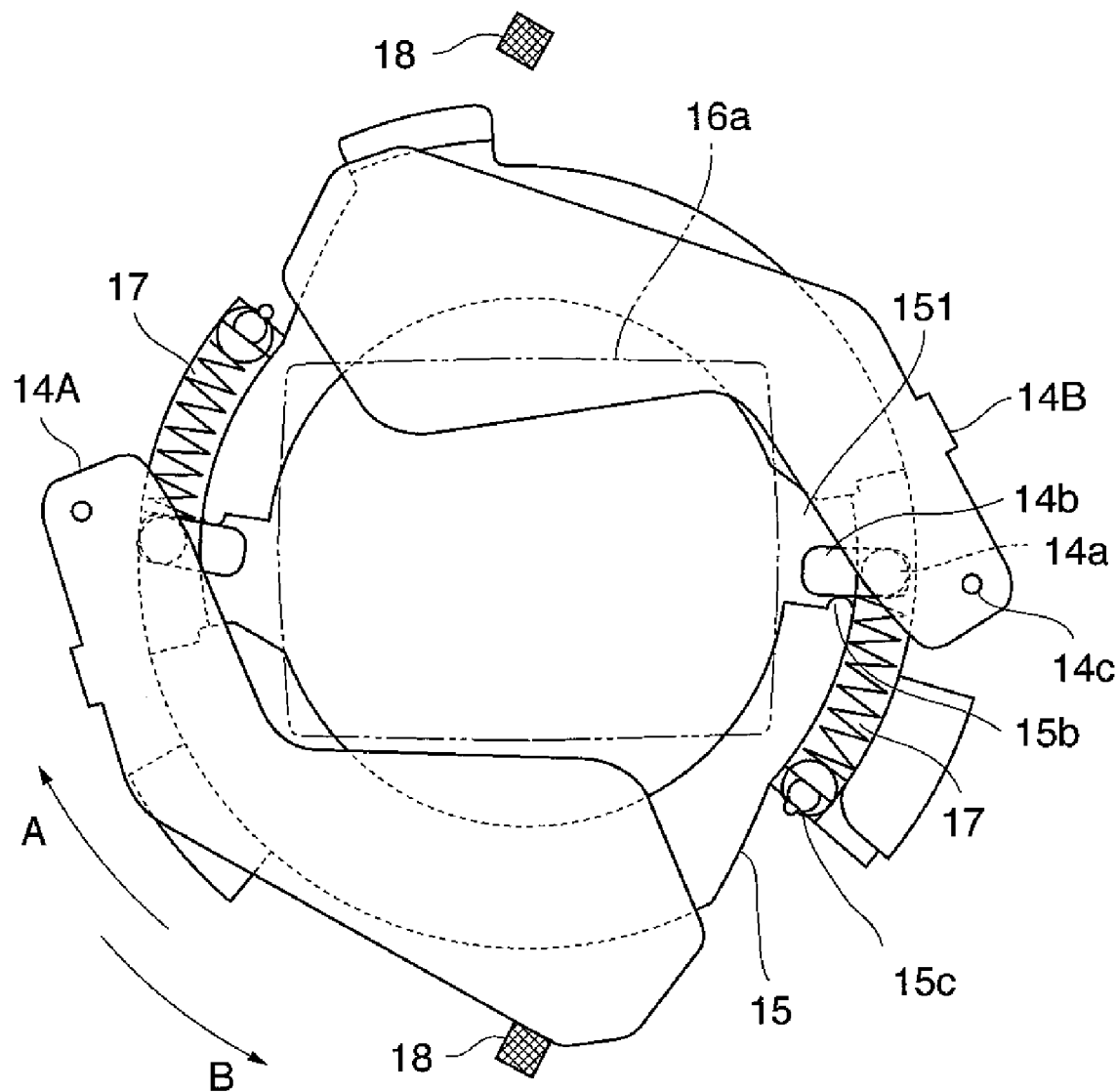
FIG. 7 is a view useful in explaining the opening/closing operation of each of the barrier blades in a state where a barrier drive member is eccentric.

FIG. 1 is an exploded perspective view useful in explaining a lens barrel according to a first embodiment of the present embodiment. FIG. 2 is a view of barrier blades of the lens barrel in a fully closed state. FIG. 3 is a view of the barrier blades of the lens barrel in a state started to open. FIG. 4 is a view of the barrier blades of the lens barrel in a fully open state. FIG. 5 is a view of the barrier blades of the lens barrel in a forcibly opened state. FIG. 6 is a graph showing the relationship between the open and closed states of the barrier blade and the amount of the charged spring force of a barrier drive spring. FIG. 7 is a view useful in explaining the opening/closing operation of each of the barrier blades in a state where a barrier drive member is eccentric.

As shown in FIG. 1, the lens barrel 11 according to the first embodiment has a photographic lens 12 and is collapsed and extended along the optical axis in accordance with operation by a photographer. A rectilinearly moving cylinder 13 for restricting the rotation of the lens barrel 11 is disposed on the inner periphery side of the lens barrel 11. The lens barrel 11 and the rectilinearly moving cylinder 13 are moved relative to each other in a direction of the optical axis in accordance with the collapsing or extending operation of the lens barrel 11. A gap between the two is large in a shooting state and small in the collapsed state of the lens barrel.

Disposed at the leading end of the lens barrel 11 are the pair of barrier blades 14, a barrier drive member 15 for driving the barrier blades 14, and a barrier cover 16 formed with a photographic aperture 16a.

The barrier blades 14 are supported at the leading end of the lens barrel 11 in a manner rotatable about respective pivots 14c (see FIG. 2). The barrier blades 14 are fully closed in the collapsed state of the lens barrel to cover the photographic aperture 16a, and are fully opened to open the photographic aperture 16a when shooting. In the vicinity of the pivot 14c of each of the barrier blades 14, there is formed a contact part 14b for contact with an associated contact part 15b of the barrier drive member 15.

The barrier drive member 15 is formed into a generally annular shape, and is rotatably supported at the leading end of the lens barrel 11. Further, as shown in FIG. 2, the barrier drive member 15 has a pair of cutouts 151 formed circumferentially apart from each other by 180°, and each of the contact parts 15b that comes into contact with the contact part 14b of the associated barrier blade 14 during rotation of the barrier drive member 15 is formed on a circumferentially-facing wall surface of the corresponding cutout 151.

Each barrier drive spring 17 is implemented by a tension coil spring in the present embodiment. The barrier drive spring 17 has one end thereof hooked to a spring hook part 14a formed on the base part of the contact part 14b of the associated barrier blade 14 and another end thereof hooked to a spring hook part 15c formed on the barrier drive member 15. The barrier drive springs 17 urge the barrier drive member 15 and the respective barrier blades 14 in a direction in which each of the contact parts 14b of the respective barrier blades 14 is brought into contact with the associated one of the contact parts 15b of the barrier drive member 15, whereby the rotation of the barrier drive member 15 and the opening/closing operation (pivotal motion) of each barrier blade 14 are interlocked with each other.

Now, a phase of the barrier drive member 15 in the state where the barrier blades 14 are fully open is referred to as the "barrier open phase" (see FIG. 4), and a phase of the barrier drive member 15 in the state where the barrier blades 14 are fully closed is referred to as the "barrier closed phase" (see FIG. 2).

As shown in FIG. 1, the barrier drive member 15 is formed with a cam surface 15a, and the rectilinearly moving cylinder 13 is formed with a cam surface 13a.

When the lens barrel 11 is collapsed, the cam surfaces 15a and 13a are brought into contact with each other to forcibly rotate the barrier drive member 15 to the "barrier closed phase" while progressively charging the barrier drive springs 17.

At this time, each of the barrier blades 14 performs a pivotal motion in the closing direction (closing operation) in accordance with the rotation of the barrier drive member 15. As a consequence, the barrier blades 14 are fully closed to cover the photographic aperture 16a.

On the other hand, when the lens barrel 11 is extended, the cam surfaces 15a and 13a in contact with each other are separated from each other, and the barrier drive member 15 rotates in a direction indicated by an arrow B to the "barrier open phase" while permitting the barrier drive springs 17 to progressively release the charged spring force thereof.

At this time, each of the barrier blades 14 performs a pivotal motion in the opening direction (opening operation) in accordance with the rotation of the barrier drive member 15. As a consequence, the barrier blades 14 are fully opened to open the photographic aperture 16a.

Now, if the lens barrel 11 is collapsed with the open barrier blades 14 restrained from closing (i.e. constrained from moving toward the closing position), the barrier drive member 15 rotates to the "barrier closed phase" while progressively charging the barrier drive springs 17. Further, if the restraint of the barrier blades 14 is released in this state, the barrier blades 14 perform a closing operation while progressively releasing the charged spring forces of the barrier drive springs 17.

If the barrier blades 14 are forcibly opened in the collapsed state of the lens barrel, the barrier blades 14 perform an opening operation while progressively charging the barrier drive springs 17. Then, when the barrier blades 14 are released from the forcible opening, the barrier blades 14 perform a closing operation while progressively discharging the barrier drive springs 17.

FIG. 6 shows the relationship between the open and closed states of the barrier blade 14 and the amount of the charged spring force of the associated barrier drive spring 17. As is apparent from FIG. 6, in the present embodiment, the amount of the charged spring force of the barrier drive spring 17 changes such that the relationship of (value thereof in the forcibly opened state in "barrier closed phase")>(value thereof in the closed state)>(value thereof in the open state) is satisfied.

Normally, a spring exerts its force in a direction in which the amount of the charged spring force thereof decreases. Therefore, in the state of the lens barrel 11 having been collapsed causing the barrier drive member 15 to rotate in a direction indicated by an arrow A to the "barrier closed phase", the barrier blades 14 are kept urged in the closing direction by the barrier drive springs 17. On the other hand, in the state of the lens barrel 11 having been extended causing the cam surfaces 15a and 13a to be separated from each other, i.e. in the state of the contact part 14b of each of the barrier blades 14 being in contact with the associated contact part 15b of the barrier drive member 15, thereby permitting the tensile force of the associated barrier drive spring 17 to act on the contact point, the barrier blades 14 are kept urged in the opening direction by the barrier drive springs 17.

It should be noted that since each of the barrier blades 14 is given an opening force by releasing the charged spring force stored in the associated barrier drive spring 17, if the amount of the charged spring force of the barrier drive spring 17 increases during the opening process of the barrier blade 14, then the barrier blade 14 cannot obtain the opening force any longer.

Therefore, in order to enable the barrier blades to smoothly open by the respective urging forces of the associated barrier drive springs 17, it is required that the amount of the charged spring force of each barrier drive spring 17 monotonously decreases as the associated barrier blade opens. Assuming that the lens barrel 11 is collapsed with the barrier blades 14 restrained from closing, and the restraint of the barrier blades 14 is released after the lens barrel has been collapsed, it is necessary that the amount of the charged spring force of each of the barrier drive springs 17 monotonously decreases as the associated barrier blade closes.

Next, the operations of the barrier blades 14, the barrier drive member 15, and the barrier drive spring 17, and conditions concerning the amount of the charged spring force of the barrier drive spring 17 will be described with reference to FIGS. 2 to 5.

FIG. 2 shows the barrier blades 14 fully closed in the collapsed state of the lens barrel. In FIG. 2, the barrier blades 14 are kept urged in the closing direction by the tensile forces of the barrier drive springs 17. The barrier blades 14 are held fully closed by the tensile forces in the collapsed state of the lens barrel. That is, each barrier drive spring 17 plays the same role as that of the conventional barrier-closing spring.

The barrier drive member 15 is kept urged by the tensile forces of the respective barrier drive springs 17 in a rotational direction indicated by an arrow B, but in the collapsed state of the lens barrel, the rotation of the barrier drive member 15 in the direction indicated by the arrow B is restrained by action of the cam surface 13a formed on the rectilinearly moving cylinder 13.

FIG. 3 shows the barrier blades 14 in a state started to open as the lens barrel 11 is slightly extended.

In this state, the barrier drive member 15 and the rectilinearly moving cylinder 13 have moved relative to each other from the collapsed state of the lens barrel shown in FIG. 2, so that the barrier drive member 15 is slightly moved by the cam surface 13a of the rectilinearly moving cylinder 13 in the direction indicated by the arrow B, bringing each of the contact parts 15b into contact with the associated one of the contact parts 14b of the respective barrier blades 14. At this time, the amount of the charged spring force of the barrier drive spring 17 has become smaller than that in the collapsed state of the lens barrel shown in FIG. 2.

Next, a description will be given of how the tensile force of each of the barrier drive springs 17 acts on the barrier drive member 15 and the associated barrier blade 14 in the state shown in FIG. 3.

The tensile force of the barrier drive spring 17 in the state shown in FIG. 3 is represented by P. A distance from the center of rotation (rotational axis) of the barrier drive member 15 to the position of contact between the contact part 15b of the barrier drive member 15 and the contact part 14b of the associated barrier blade 14 in a direction orthogonal to a direction in which the tensile force P of the barrier drive spring 17 acts on the associated barrier blade 14 is represented by L1.

Further, a distance from the center of pivotal motion (pivot 14c) of the barrier blade 14 to the position of contact between the contact part 14b of the barrier blade 14 and the contact part 15b of the barrier drive member 15 is represented by L3, and a distance from the center of pivotal motion (pivot 14c) of the barrier blade 14 to the spring hook part 14a (point of force application) is represented by L4.

Furthermore, a distance from the center of rotation of the barrier drive member 15 to the spring hook part 15c (point of force application) of the barrier drive spring 17 in a direction orthogonal to a direction in which the tensile force P acts on the barrier drive member 15 is represent by L2.

A moment Mc that rotates the barrier drive member 15 in the closing direction (indicated by an arrow A) is transmitted to the barrier drive member 15 by the barrier blade 14. This moment Mc can be expressed by an equation of Mc=P×(L4/L3)×L1. On the other hand, a moment Mo that rotates the barrier drive member 15 in the opening direction (indicated by an arrow B) can be expressed by an equation of Mo=P=L2.

When the moment Mo that rotates the barrier drive member 15 in the opening direction is larger than the moment Mc that rotates the barrier drive member 15 in the closing direction, i.e. when P×L2>P×(L4/L3)×L1→L2×L3>L1×L4 (expression (1)) holds, a force for rotating the barrier drive member 15 in the opening direction overcomes a force for rotating the barrier drive member 15 in the closing direction. As a consequence, each of the barrier drive springs 17 operates to rotate the barrier drive member 15 in the opening direction. That is, the barrier drive spring 17 plays the same role as the conventional barrier-opening spring does in the prior art. At this time, as the barrier blades 14 open, the amount of charged spring force of each of the barrier drive springs 17 decreases.

It should be noted that since the two barrier drive springs 17 are used in the present embodiment, each of the opening and closing moments that act on the barrier drive member 15 doubles. However, the relationship in strength between the two moments is the same, and therefore the expression (1) still holds.

FIG. 4 shows the barrier blades of the lens barrel in a state fully opened after the lens barrel 11 is further extended. In this state, the cam surface 15a of the barrier drive member 15 and the cam surface 13a of the rectilinearly moving cylinder 13 are completely separated from each other. Therefore, the barrier drive member 15 has been further moved in the direction indicated by the arrow B to the "barrier open phase", with the amount of charged spring force of each of the barrier drive springs 17 being further decreased.

Each of the barrier blades 14 continues to be urged in the opening direction by the associated one of the contact parts 15b of the barrier drive member 15. However, the free end of the barrier blade 14 is in contact with a stopper 18 formed in the lens barrel 11, and hence a further pivotal motion of the barrier blade 14 in the opening direction is restrained. At this time, when conditions concerning the involved moments satisfy the above expression (1), torque in the opening direction acts on the barrier blade 14, so that the barrier blade 14 is held in the open state.

FIG. 5 shows the barrier blades 14 in a state forcibly opened when the lens barrel 11 is in the collapsed state. In this state, the barrier drive member 15 is in the "barrier closed phase" and has its rotation restrained by the cam surface 13a of the rectilinearly moving cylinder 13, so that even when the barrier blades 14 are forcibly opened, the barrier drive member 15 is restrained from rotation.

Therefore, when the barrier blades 14 are forcibly opened, the barrier drive springs 17 are further charged than when the barrier blades 14 are in the closed state. Then, when the barrier blades 14 are released from the forcibly opened state, the barrier drive springs 17 close the barrier blades 14 while permitting the charged spring forces of the barrier drive springs 17 to be released. In short, each of the barrier drive springs 17 plays the same role as the conventional barrier-opening spring does in the prior art.

By the way, since the barrier drive member 15 is rotatably supported in the lens barrel 11, it is required to create some radial clearance between the barrier drive member 15 and the lens barrel 11 so as to ensure smooth rotation of the barrier drive member 15. In this case, there is a fear that the barrier drive member 15 is eccentric with respect to the lens barrel 11.

Next, a description will be given of the opening operation of the barrier blade 14 in the case where the barrier drive member 15 is eccentric.

FIG. 7 shows the barrier drive member 15 in a state eccentric downward, as viewed in FIG. 7, with respect to the lens barrel 11 during rotation to the "barrier open phase". In this state, one barrier blade 14A of the two barrier blades 14 has come into abutment with the associated stopper 18 earlier than the other barrier blade 14B. In such a case, the prior art suffers from the inconvenience that the rotation of the barrier drive member 15 in the direction indicated by the arrow B is hindered by the one barrier blade 14A brought into contact with the stopper 18, and hence the other barrier blade 14B, which is not in contact with the stopper 18 associated therewith, remains inside the photographic aperture 16a.

In contrast, according to the present embodiment, each of the barrier drive springs 17 hooked to the respective barrier blades 14 independently urges the barrier drive member 15 in the opening direction while releasing the charged spring force thereof. For this reason, the barrier drive spring 17 hooked to the barrier blade 14 which is not in contact with the stopper 18 associated therewith keeps on urging the barrier drive member 15 in the direction indicated by the arrow B. As a consequence, the barrier drive member 15 rotates in the direction indicated by the arrow B about the contact part in contact with the barrier blade 14A already in contact with the stopper 18. Thus, even when the barrier drive member 15 is eccentric, the barrier blades 14 can be fully opened.

As described above, in the present embodiment, the amount of the charged spring force of the barrier drive spring 17 is in the relationship of (value thereof in the forcibly opened state in the "barrier closed phase")>(value thereof in the closed state)>(value thereof in the open state). This enables the barrier drive spring 17 to have the same functions as those of the conventional barrier-opening spring and the conventional barrier-closing spring.

Thus, the number of component parts can be reduced, which makes it possible not only to reduce costs and assembling man-hours, but also to achieve reduction of the size of the lens barrel by space saving.

Further, since each of the barrier drive springs 17 hooked to the respective barrier blades 14 independently urges the associated barrier blade 14 in the opening direction, even when the barrier drive member 15 is eccentric, it is possible to positively fully open the barrier blades 14 to thereby open the photographic aperture 16a.

Next, a lens barrel according to a second embodiment of the present invention will be described with reference to FIGS. 8 to 11.

Figure 8:
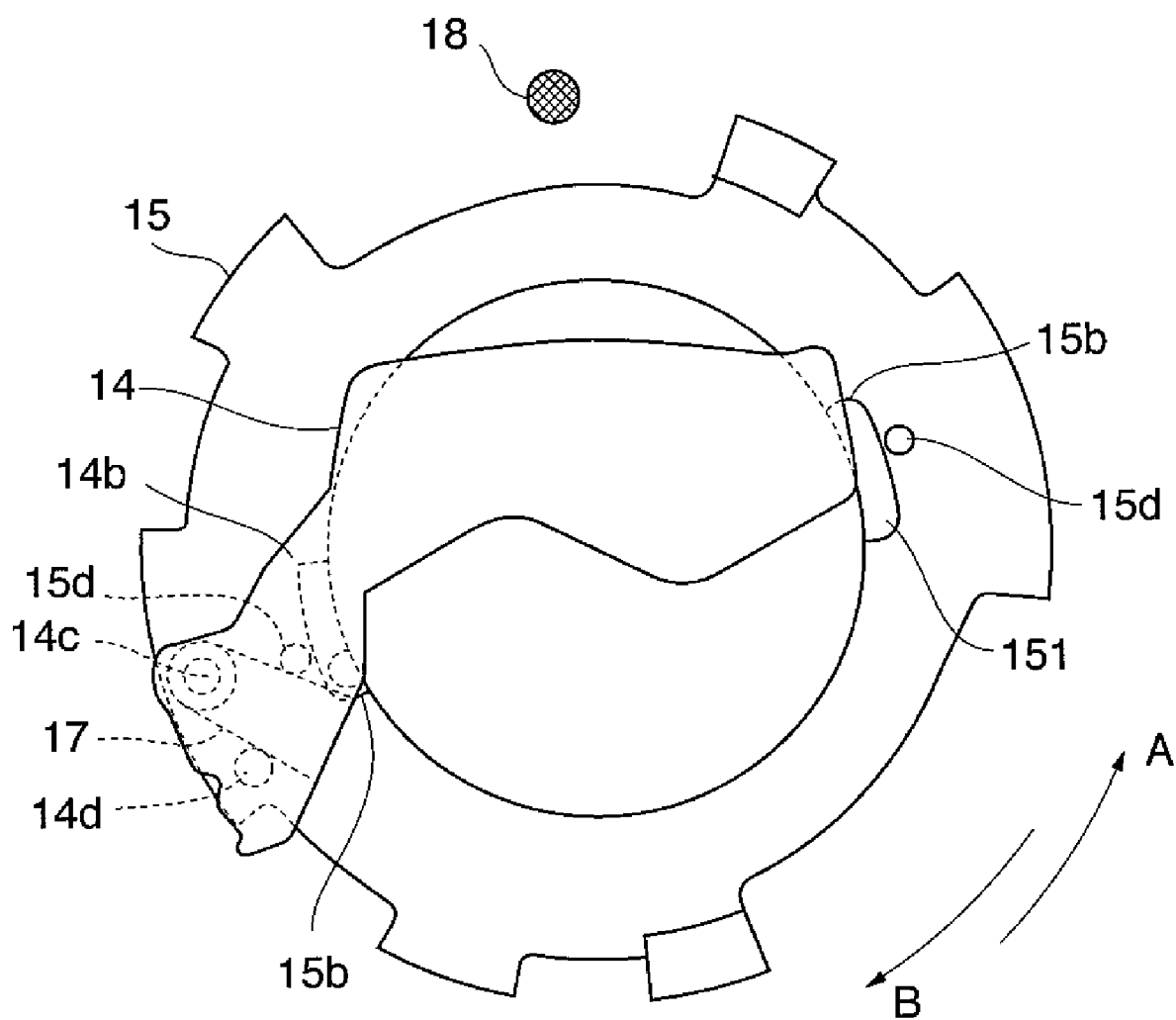
FIG. 8 is a view of a barrier blade of a lens barrel according to a second embodiment of the present invention, in a fully closed state.
Figure 9:
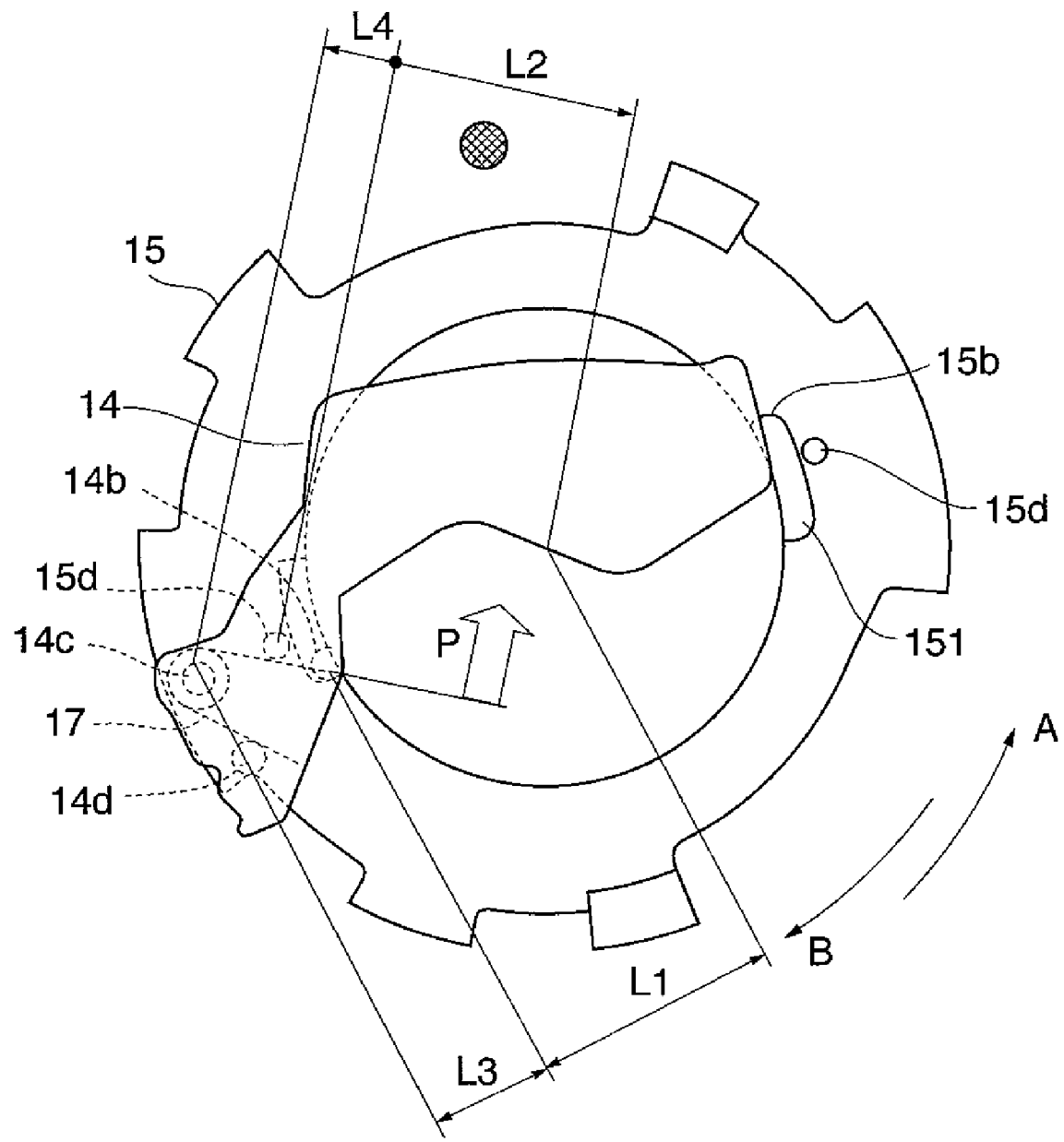
FIG. 9 is a view of the barrier blade of the lens barrel in a state started to open.
Figure 10:
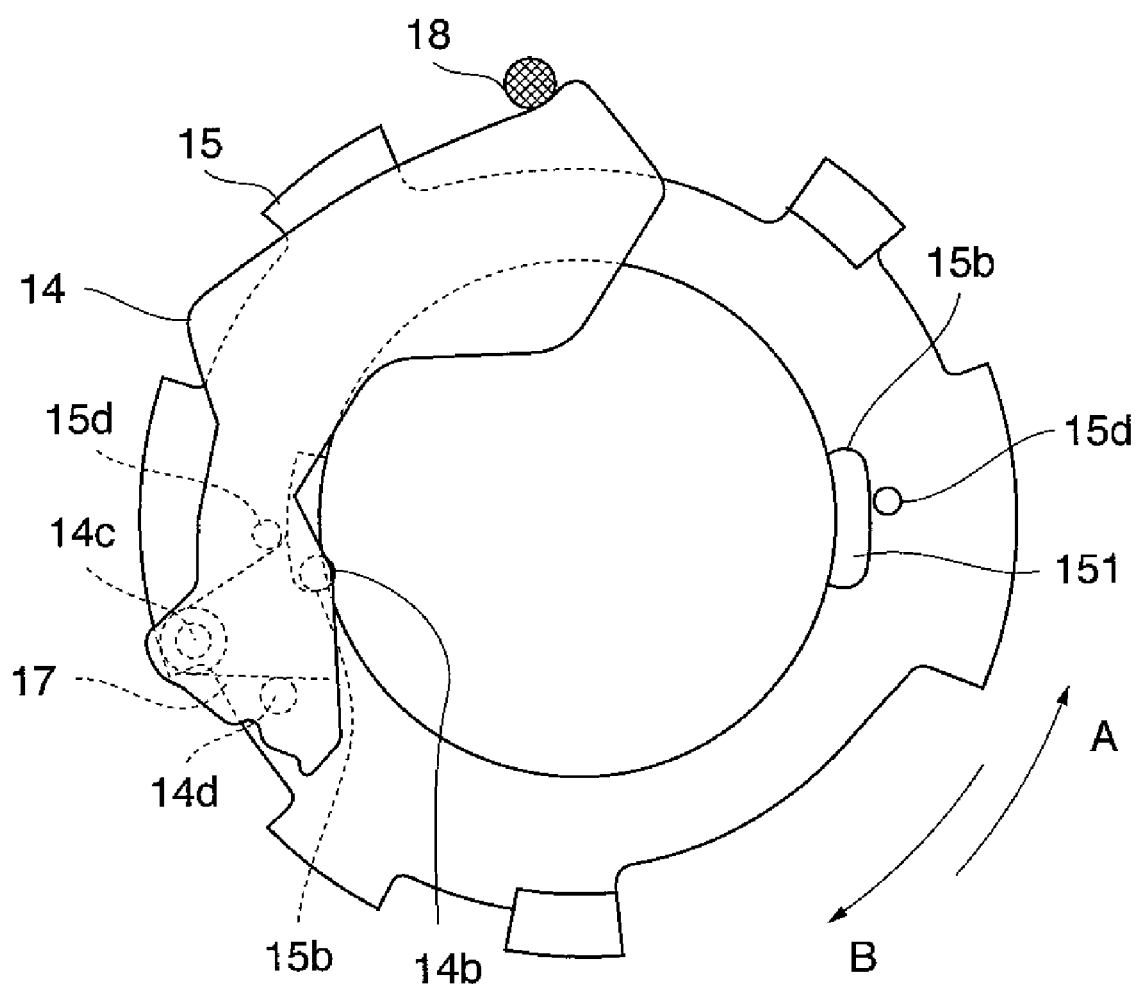
FIG. 10 is a view of the barrier blade of the lens barrel in a fully open state.
Figure 11:
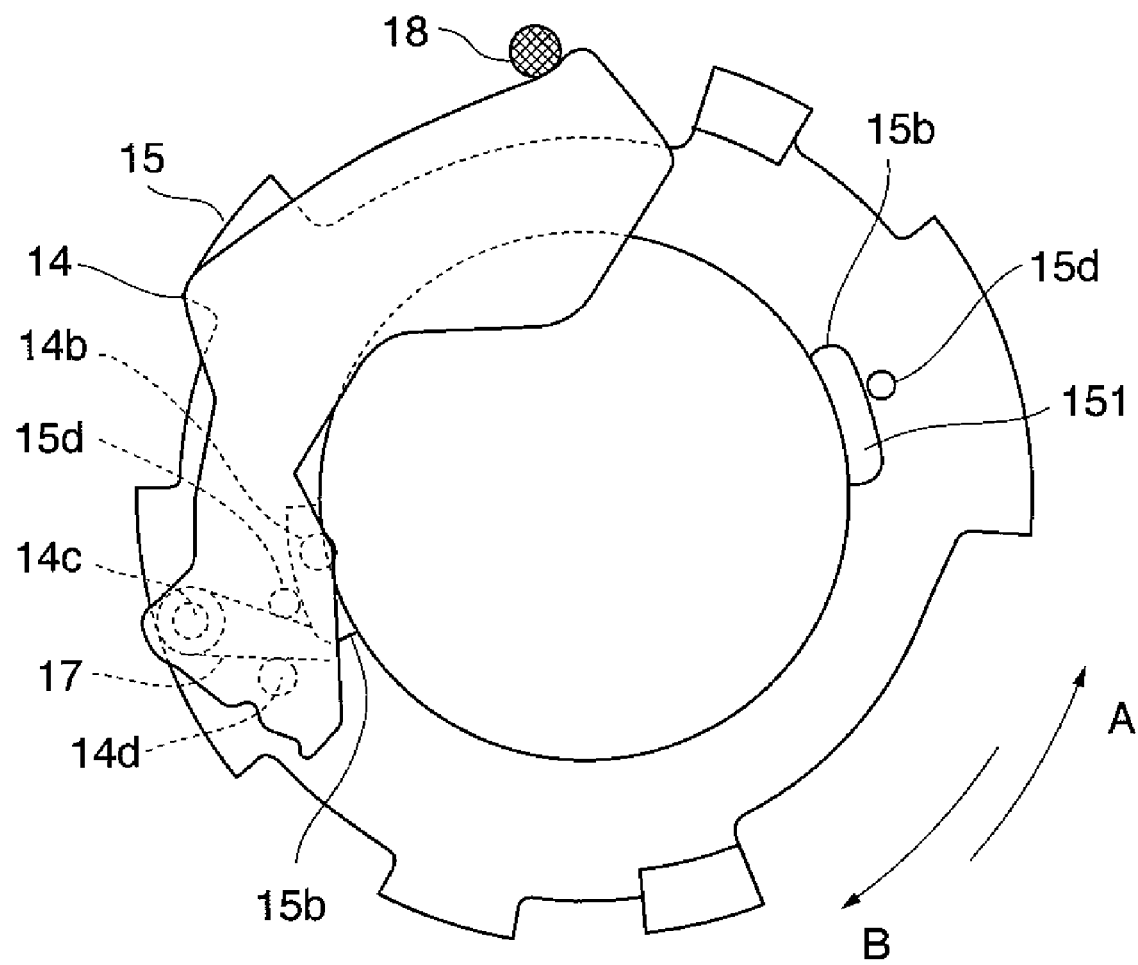
FIG. 11 is a view of the barrier blade of the lens barrel in a forcibly opened state.

FIG. 8 is a view of a barrier blade of the lens barrel according to the second embodiment in a fully closed state. FIG. 9 is a view of the barrier blade of the lens barrel in a state started to open. FIG. 10 is a view of the barrier blade of the lens barrel in a fully open state. FIG. 11 is a view of the barrier blade of the lens barrel in a forcibly opened state. It should be noted that although only one of the two barrier blades is shown in each of the figures for clarity, the two barrier blades 14 are used in actuality as in the above-described first embodiment. The following description is given by designating component parts and elements identical or corresponding to those of the first embodiment by identical reference numerals.

Referring to FIG. 8, as in the first embodiment, the lens barrel 11 according to the second embodiment has the barrier drive member 15 formed into a generally annular shape and supported at the leading end thereof. Further, the barrier drive member 15 has the pair of cutouts 151 formed circumferentially apart from each other by 180°, and each of the cutouts 151 has a circumferentially-facing wall surface thereof formed with the contact part 15b for contact with the contact part 14b of the associated barrier blade 14 during rotation of the barrier drive member 15.

When the lens barrel 11 is collapsed, the cam surfaces 15a and 13a are brought into contact with each other to forcibly rotate the barrier drive member 15 in a direction indicated by an arrow A to the "barrier closed phase" (see FIG. 8) while progressively charging the barrier drive spring 17.

At this time, the barrier blade 14 performs a pivotal motion in the closing direction (closing operation) in accordance with the rotation of the barrier drive member 15. As a consequence, the barrier blade 14 is fully closed to cover the photographic aperture 16a.

On the other hand, when the lens barrel 11 is extended, the cam surfaces 15a and 13a in contact with each other are separated from each other, and the barrier drive member 15 rotates in a direction indicated by an arrow B to the "barrier open phase" (see FIG. 10) while progressively releasing the charged spring force of the barrier drive spring 17.

At this time, the barrier blade 14 performs a pivotal motion in the opening direction (opening operation) in accordance with the rotation of the barrier drive member 15. As a consequence, the barrier blade 14 is fully opened to open the photographic aperture 16a.

The barrier blade 14 is supported in the lens barrel 11 in a manner movable about the pivot 14c. A barrier drive spring 17 of a torsion spring type is rotatably fitted on the pivot 14c of the barrier blade 14.

The barrier drive spring 17 urges the barrier drive member 15 and the barrier blade 14 in a direction in which the contact part 14b of the barrier blade 14 is brought into contact with the contact part 15b of the barrier drive member 15, whereby the rotation of the barrier drive member 15 and the opening/closing (pivotal) operation of the barrier blade 14 are interlocked with each other. It should be noted that the amount of the charged spring force of the barrier drive spring 17 is set such that the condition of (value thereof in the forcibly opened state in the "barrier closed phase")>(value thereof in the closed state)>(value thereof in the open state) is satisfied, as in the above-described first embodiment.

Next, the operations of the barrier blade 14, the barrier drive member 15, and the barrier drive spring 17, and conditions concerning the amount of the charged spring force of the barrier drive spring 17 will be described with reference to FIGS. 8 to 11.

Referring to FIG. 8, one end of the barrier drive spring 17 is caught by a hooking dowel 14d implanted on the barrier blade 14, and urges the barrier blade 14 in the closing direction. The barrier blade 14 is held closed by this urging force. That is, the barrier drive spring 17 plays the same role as the conventional barrier-closing spring does in the prior art.

The other end of the barrier drive spring 17 is caught by a hooking dowel 15d implanted on the barrier drive member 15, and urges the barrier drive member 15 in the direction indicated by the arrow B. However, in the collapsed state of the lens barrel, the rotation of the barrier drive member 15 in the direction indicated by the arrow B is restrained by the action of the cam surface 13a formed on the rectilinearly moving cylinder 13.

FIG. 9 shows the lens barrel 11 in a state slightly extended causing the barrier drive member 15 to be rotated in the opening direction to bring the contact part 15b of the barrier drive member 15 into contact with the contact part 14b of the barrier blade 14. In this state, the amount of the charged spring force of the barrier drive spring 17 is smaller than when the lens barrel is in the collapsed state as shown in FIG. 8.

Next, a description will be given of how the tensile force of the barrier drive spring 17 acts on the barrier drive member 15 and the barrier blade 14 in the state shown in FIG. 9.

Torque of the barrier drive spring 17 in the state shown in FIG. 9 is represented by M. A distance from the center of rotation of the barrier drive member 15 to the position of contact between the contact part 15b and the contact part 14b in a direction orthogonal to a direction in which the force of the barrier drive spring 17 drives the barrier blade 14 by contact with the same is represented by L1, and a distance from the center of pivotal motion (pivot 14c) of the barrier blade 14 to the position of contact between the contact part 14b and the contact part 15b is represented by L3.

Further, a distance from the center of rotation of the barrier drive member 15 to the hooking dowel 15d (point of force application) of the barrier drive member 15 in a direction orthogonal to a direction in which the spring force P acts on the barrier drive member 15 is represent by L2, and a distance from the center of pivotal motion of the barrier blade 14 to the hooking dowel 15d (point of force application) of the barrier drive member 15 is represented by L4.

In this case, a moment Mc generated by the barrier blade 14 being pressed by the barrier drive spring 17, to act in the closing direction can be expressed by an equation of Mc=M. On the other hand, the pressing force P which the barrier drive member 15 receives from the barrier drive spring 17 can be expressed by an equation of P=M/L4. Therefore, a moment Mo' that rotates the barrier drive member 15 in the opening direction can be expressed by an equation of Mo'=P×L2=M×L2/L4, and a moment Mo generated by the barrier blade 14 being pressed by the barrier drive member 15, to act in the opening direction can be expressed by an equation of Mo=(Mo'/L1)×L3=M×L2×L3/(L1×L4).

When the moment Mo for rotation in the opening direction is larger than the moment Mc (=M) for rotation in the closing direction, i.e. when M×L2×L3/(L1×L4)>M→L2×L3>L1×L4 (expression (2)) holds, a force for rotating the barrier drive member 15 in the opening direction overcomes a force for rotating the barrier blade 14 in the closing direction. As a consequence, the barrier drive spring 17 operates to rotate the barrier drive member 15 in the opening direction. That is, the barrier drive spring 17 plays the same role as the conventional barrier-opening spring does in the prior art. At this time, as the barrier blade 14 opens, the amount of the charged spring force of the barrier drive spring 17 decreases.

FIG. 10 shows the lens barrel 11 in a state further extended causing the barrier blade to be fully opened.

In this state, the cam surface 15a of the barrier drive member 15 and the cam surface 13a of the rectilinearly moving cylinder 13 are completely separated from each other. Therefore, the barrier drive member 15 has been further moved in the direction indicated by the arrow B to the "barrier open phase", and the amount of the charged spring force of the barrier drive spring 17 has been further reduced.

The barrier blade 14 is still pressed in the opening direction at the contact part 14b for contact with the barrier drive member 15, but when the free end of the barrier blade 14 is brought into abutment with the stopper 18 formed on the lens barrel 11, the pivotal motion of the barrier blade 14 in the opening direction is restrained. At this time, when the above expression (2) is satisfied, torque in the opening direction acts on the barrier blade 14, so that the barrier blade 14 is held in the open state.

FIG. 11 shows the barrier blade 14 is in a state forcibly opened when the lens barrel 11 is in the collapsed state.

In this state, the barrier drive member 15 is in the "barrier closed phase" and has its rotation restrained by the cam surface 13a of the rectilinearly moving cylinder 13, so that even when the barrier blade 14 is forcibly opened, the barrier drive member 15 is restrained from rotation. Therefore, when the barrier blade 14 is forcibly opened, the barrier drive spring 17 is further charged than when the barrier blade 14 is in the closed state. Then, when the barrier blade 14 is released from the forcibly opened state, the barrier drive spring 17 closes the barrier blade 14 while releasing the charged spring force thereof. That is, the barrier drive spring 17 plays the same role as the conventional barrier-closing spring does in the prior art.

As described above, similarly to the first embodiment, the present embodiment enables each of the barrier drive springs 17 to have the same functions as those of the conventional barrier-opening spring and the conventional barrier-closing spring. Thus, the number of component part can be reduced, which makes it possible not only to reduce manufacturing costs and assembling man-hours, but also to achieve reduction of the size of the lens barrel by space saving.

Further, since each of the barrier drive springs 17 hooked to the respective barrier blades 14 independently urges the associated barrier blade 14 in the opening direction, even when the barrier drive member 15 is eccentric, it is possible to positively fully open the barrier blades 14 to thereby open the photographic aperture 16a.

Furthermore, since each of the barrier drive springs 17 is implemented by a torsion spring, it is possible to make the dimension of a space in the direction of thickness smaller than in the case where the tension coil spring is used, to thereby realize a lens barrel having a reduced thickness.

Next, a lens barrel according to a third embodiment of the present invention will be described with reference to FIGS. 12 to 15.

Figure 12:
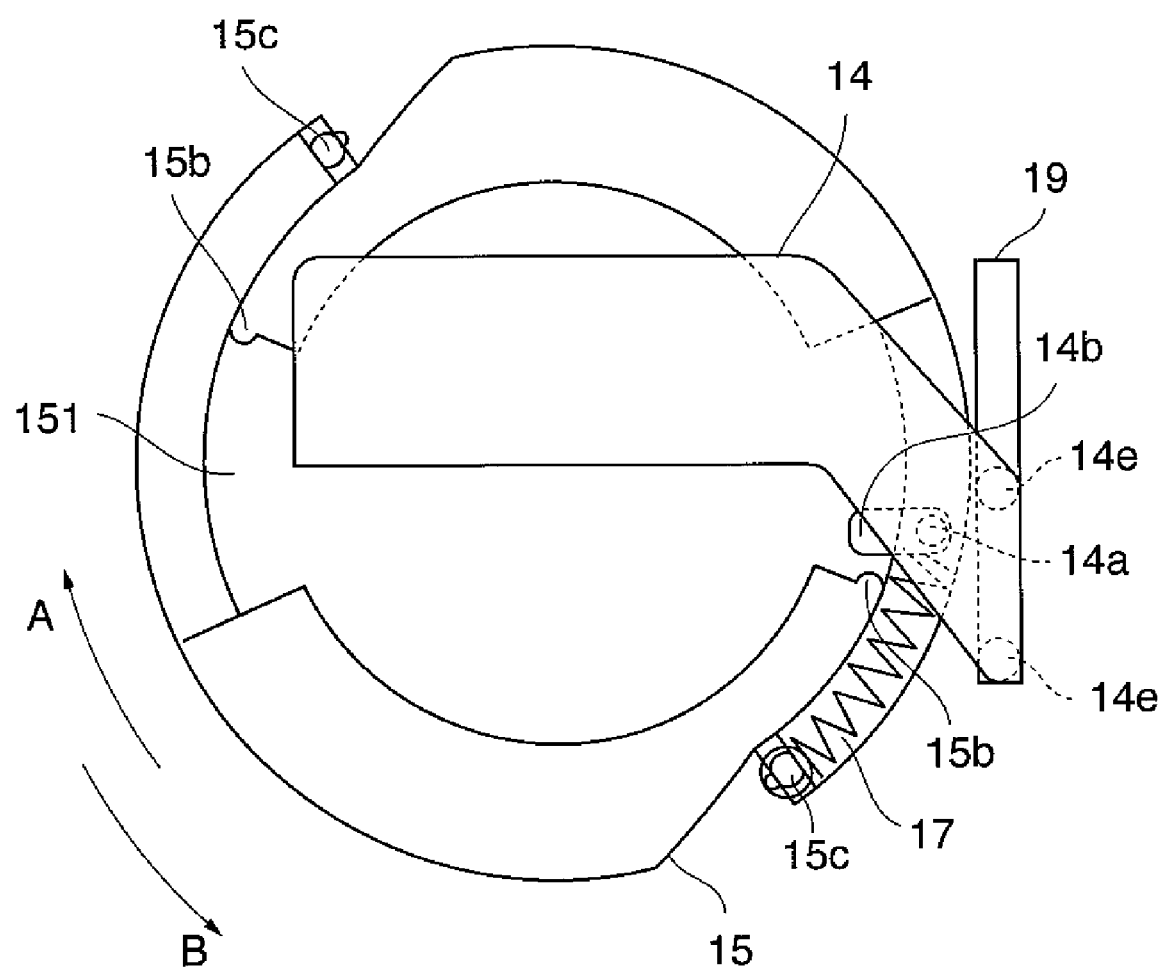
FIG. 12 is a view of a barrier blade of a lens barrel according to a third embodiment of the present invention, in a fully closed state.
Figure 13:
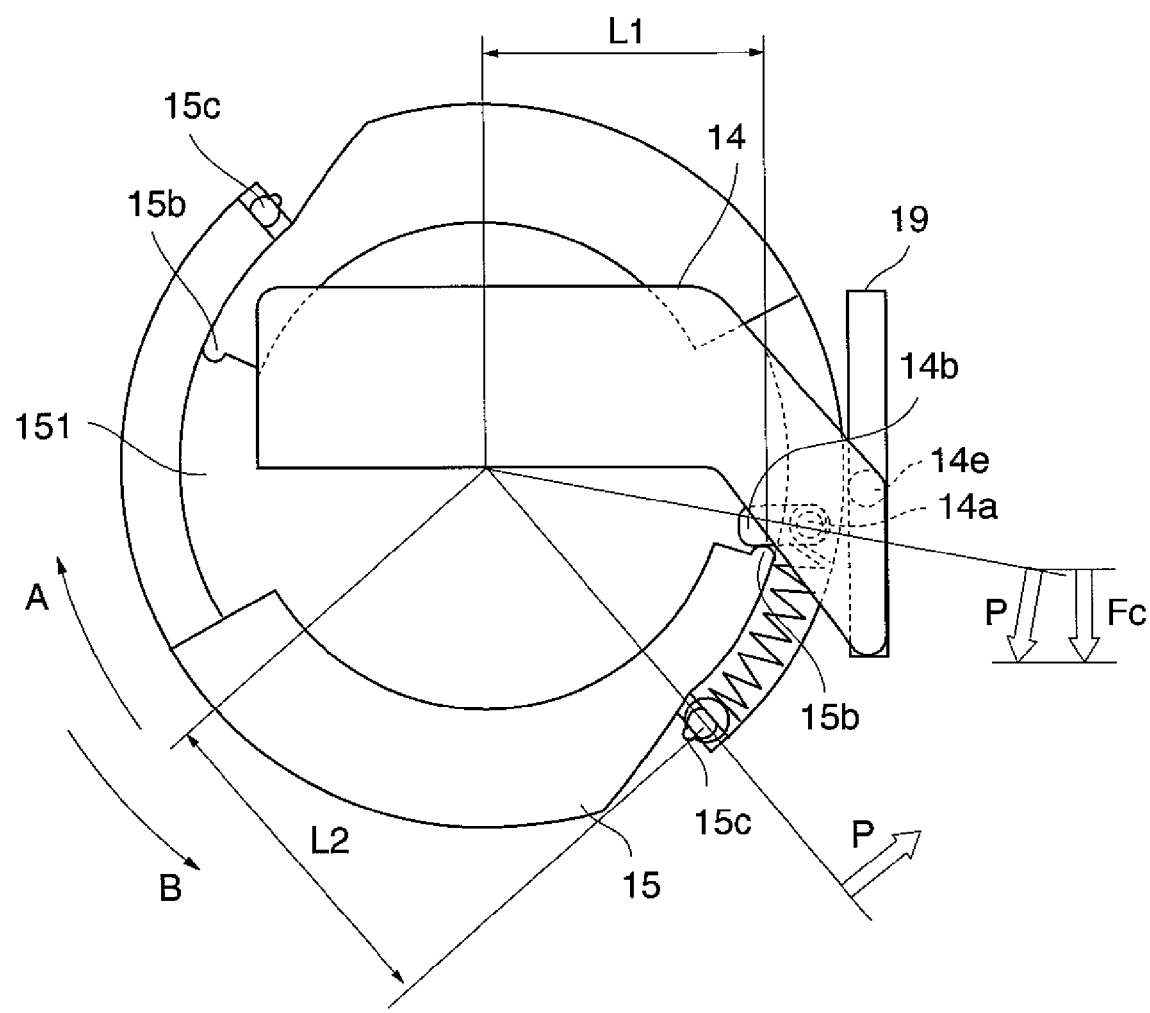
FIG. 13 is a view of the barrier blade of the lens barrel in a state started to open.
Figure 14:
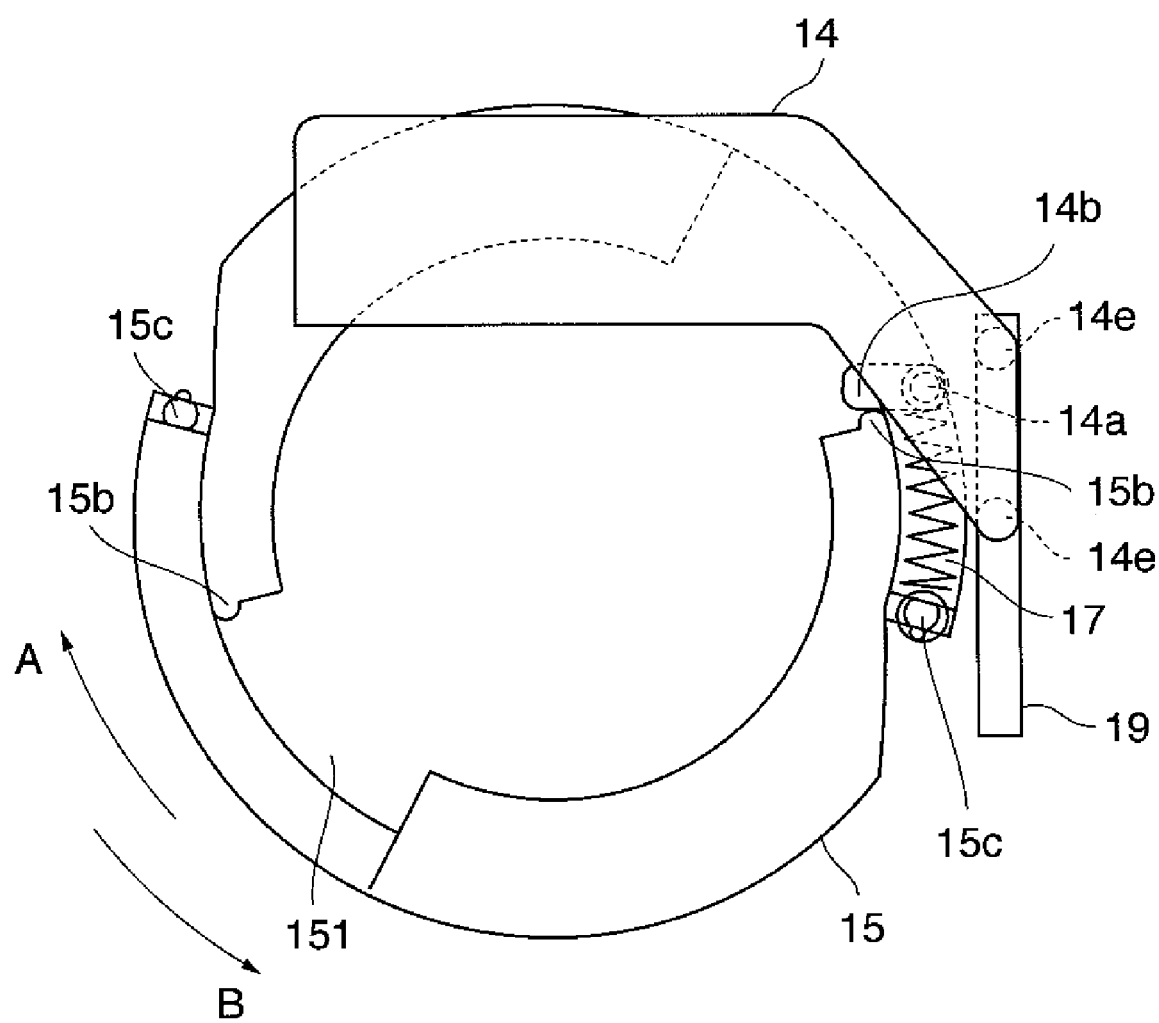
FIG. 14 is a view of the barrier blade of the lens barrel in a fully open state.
Figure 15:
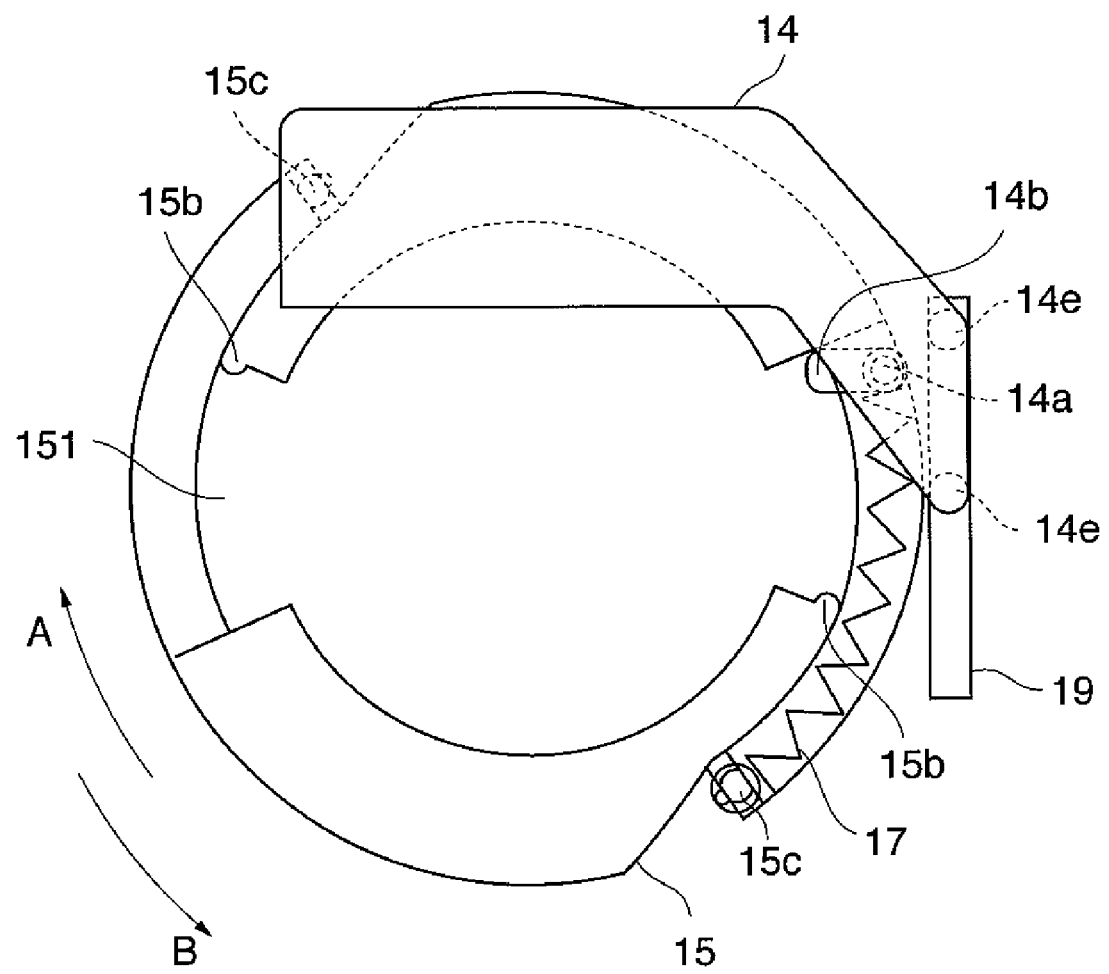
FIG. 15 is a view showing of the barrier blade of the lens barrel in a forcibly opened state.

FIG. 12 is a view of a barrier blade of the lens barrel according to the third embodiment in a fully closed state. FIG. 13 is a view of the barrier blade of the lens barrel in a state started to open. FIG. 14 is a view of the barrier blade of the lens barrel in a fully open state. FIG. 15 is a view of the barrier blade of the lens barrel in a forcibly opened state. It should be noted that although only one of the two barrier blades is shown in each of the figures for clarity, the two barrier blades 14 are used in actuality as in the above-described first embodiment. The following description is given by designating component parts and elements identical or corresponding to those of the first embodiment by identical reference numerals.

Referring to FIG. 12, as in the first embodiment, the lens barrel 11 according to the third embodiment has the barrier drive member 15 formed into a generally annular shape and supported at the leading end thereof. Further, the barrier drive member 15 has the pair of cutouts 151 formed circumferentially apart from each other by 180°, and each of the cutouts 151 has a circumferentially-facing wall surface thereof formed with the contact part 15b for contact with the contact part 14b of the associated barrier blade 14 during rotation of the barrier drive member 15.

When the lens barrel 11 is collapsed, the cam surfaces 15a and 13a are brought into contact with each other to forcibly rotate the barrier drive member 15 in a direction indicated by an arrow A to the "barrier closed phase" (see FIG. 12) while progressively charging the barrier drive spring 17.

At this time, the barrier blade 14 performs a pivotal motion in the closing direction (closing operation) in accordance with the rotation of the barrier drive member 15. As a consequence, the barrier blade 14 is fully closed to cover the photographic aperture 16a.

On the other hand, when the lens barrel 11 is extended, the cam surfaces 15a and 13a in contact with each other are separated from each other, and the barrier drive member 15 rotates in a direction indicated by an arrow B to the "barrier open phase" (see FIG. 14) while progressively releasing the charged spring force of the barrier drive spring 17.

At this time, the barrier blade 14 performs a pivotal motion in the opening direction (opening operation) in accordance with the rotation of the barrier drive member 15. As a consequence, the barrier blade 14 is fully opened to open the photographic aperture 16a.

The barrier blade 14 has a base end formed with two protrusions 14e, and the two protrusions 14e are slidably inserted into a guide groove 19 formed in the lens barrel 11. The barrier blade 14 performs a linear motion along the guide groove 19 and in parallel with a diametrical direction of the barrier drive member 15, whereby the photographic aperture 16a is opened or closed.

Between the barrier blade 14 and the barrier drive member 15, there is provided the barrier drive spring 17 implemented by a tension coil spring. The barrier drive spring 17 urges the barrier drive member 15 and the barrier blade 14 in a direction in which the contact part 14b of the barrier blade 14 is brought into contact with the contact part 15b of the barrier drive member 15, whereby the rotation of the barrier drive member 15 and the opening/closing (pivotal) operation of the barrier blade 14 are interlocked with each other. It should be noted that the amount of the charged spring force of the barrier drive spring 17 is set such that the condition of (value thereof in the forcibly opened state in the "barrier closed phase")>(value thereof in the closed state)>(value thereof in the open state) is satisfied, as in the above-described first embodiment.

Next, the operations of the barrier blade 14, the barrier drive member 15, and the barrier drive spring 17, and conditions concerning the amount of the charged spring force of the barrier drive spring 17 will be described with reference to FIGS. 12 to 15.

FIG. 12 shows the barrier blade 14 in a fully closed state in the collapsed state of the lens barrel. In FIG. 12, the barrier blade 14 is urged in the closing direction by the tensile force of the barrier drive spring 17. The barrier blade 14 is held closed by this urging force. That is, the barrier drive spring 17 plays the same role as the conventional barrier-closing spring does in the prior art. The barrier drive member 15 is urged by the tensile force of the barrier drive spring 17 in a direction indicated by an arrow B. However, in the collapsed state of the lens barrel, the rotation of the barrier drive member 15 in the direction indicated by the arrow B is restrained by the action of the cam surface 13a formed on the rectilinearly moving cylinder 13.

FIG. 13 shows the barrier blade 14 in a state started to open by slight extension of the lens barrel 11. In this state, the barrier drive member 15 and the rectilinearly moving cylinder 13 have moved relative to each other from the collapsed state of the lens barrel, so that the barrier drive member 15 is slightly moved by the cam surface 13a of the rectilinearly moving cylinder 13 in the direction indicated by the arrow B, causing the contact part 15b to be brought into contact with the contact part 14b of the barrier blade 14. In this state, the amount of the charged spring force of the barrier drive spring 17 has become smaller than when the lens barrel is in the collapsed state shown in FIG. 12.

Next, a description will be given of how the tensile force of the barrier drive spring 17 acts on the barrier drive member 15 and the barrier blade 14 in the state shown in FIG. 13.

The tensile force of the barrier drive spring 17 in the state shown in FIG. 13 is represented by P. Further, a component force of the tensile force P, which acts in parallel with the guide groove 19, is represented by Fc. A distance from the center of rotation of the barrier drive member 15 to the position of contact between the contact part 15b and the contact part 14b of the barrier blade 14 in a direction orthogonal to a direction in which the component force Fc acts on the barrier blade 14 is represented by L1.

Further, a distance from the center of rotation of the barrier drive member 15 to the spring hook part 15c (point of force application) of the barrier drive member 15 in a direction orthogonal to a direction in which the tensile force P acts on the barrier drive member 15 is represent by L2.

In this case, a moment Mc that rotates the barrier drive member 15 in the closing direction (indicated by an arrow A) is transmitted to the barrier drive member 15 by the barrier blade 14. The moment Mc can be expressed by an equation of Mc=Fc×L1. On the other hand, a moment Mo that rotates the barrier drive member 15 in the opening direction (indicated by an arrow B) can be expressed by an equation of Mo=P×L2.

While the magnitude of the component force Fc changes according to the amount of opening of the barrier blade 14, the relationship of P≧Fc is always satisfied, and hence Mc=Fc×L1≦P×L1 holds. Therefore, L2>L1 (expression (3)) →Mo=P×L2>P×L1≧Fc×L1=Mc→Mo>Mc holds.

From the above, insofar as the expression (3) is satisfied, the moment Mo for rotating the barrier blade 14 in the opening direction is larger than the moment Mc (=M) for rotating the same in the closing direction, and the force of the barrier drive member 15 for rotation in the opening direction overcomes the force of the barrier blade 14 for rotation in the closing direction. As a consequence, the barrier drive spring 17 causes the barrier drive member 15 to rotate in the opening direction. That is, the barrier drive spring 17 plays the same role as the conventional barrier-opening spring does in the prior art. At this time, as the barrier blade 14 opens, the amount of the charged spring force of the barrier drive spring 17 decreases.

FIG. 14 shows the lens barrel 11 in a state further extended, causing the barrier blade to be fully opened.

In this state, the cam surface 15a of the barrier drive member 15 and the cam surface 13a of the rectilinearly moving cylinder 13 are completely separated from each other. Therefore, the barrier drive member 15 has been further moved in the direction indicated by the arrow B to the "barrier open phase", and the amount of the charged spring force of the barrier drive spring 17 has been further reduced.

The barrier blade 14 is still pressed in the opening direction by the contact part 15b of the barrier drive member 15, but the abutment of one of the protrusions 14e with one end of the guide groove 19 restrains the barrier blade 14 from being moved in the opening direction. At this time, when the above expression (3) is satisfied, a force in the opening direction acts on the barrier blade 14, so that the barrier blade 14 is held in the open state.

FIG. 15 shows the barrier blade 14 in a state forcibly opened when the lens barrel 11 is in the collapsed state.

In this state, the barrier drive member 15 is in the "barrier closed phase" and has its rotation restrained by the cam surface 13a of the rectilinearly moving cylinder 13, so that even when the barrier blade 14 is forcibly opened, the barrier drive member 15 is restrained from rotation. Therefore, when the barrier blade 14 is forcibly opened, the barrier drive spring 17 is further charged than when the barrier blade 14 is in the closed state. Then, when the barrier blade 14 is released from the forcibly opened state, the barrier drive spring 17 closes the barrier blade 14 while releasing the charged spring force thereof. That is, the barrier drive spring 17 plays the same role as the conventional barrier-opening spring does in the prior art.

As described above, similarly to the first embodiment, the present embodiment enables each of the barrier drive springs 17 to have the same functions as those of the conventional barrier-opening spring and the conventional barrier-closing spring. Thus, the number of component part can be reduced, which makes it possible not only to reduce costs and assembling man-hours, but also to achieve reduction of the size of the lens barrel by space saving.

Further, since each of the barrier drive springs 17 hooked to the respective barrier blades 14 independently urges the associated barrier blade 14 in the opening direction, even when the barrier drive member 15 is eccentric, it is possible to positively fully open the barrier blades 14 to thereby open the photographic aperture 16a.

According to the present embodiment, since the advantageous effects of the present invention can be provided not by the opening/closing operation attained by the pivotal motion of the barrier blade 14, but by the opening/closing operation attained by the linear motion of the barrier blade 14, it is possible to apply the present invention without reducing the freedom of design.

It should be noted that the barrier blades, the barrier drive member, the barrier drive springs, etc. of the present invention are not limited in construction to the above-described embodiments, but they can be modified or altered insofar as they do not depart from the subject matter of the present invention.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application No. 2006-208647, Jul. 31, 2006 which is hereby incorporated by reference herein in its entirety.

What is claimed is:

1. A lens barrel comprising:
a barrier blade configured to open and close over a photographic aperture;
a barrier drive member configured to move between a closing position for causing said barrier blade to close the photographic aperture and an opening position for causing said barrier blade to open the photographic aperture, thereby driving said barrier blade between a standby position for covering the photographic aperture and an image-taking position for opening the photographic aperture; and
a barrier drive spring, an amount of a charged spring force of which varies in accordance with the opening/closing operation of said barrier blade,
wherein, as said barrier drive member moves from the closing position to the opening position to cause said barrier blade to perform an opening operation, the amount of the charged spring force of said barrier drive spring progressively decreases,
wherein as said barrier drive member is moved to the closing position, in a state in which said barrier blade is constrained from moving toward the closing position, the amount of the charged spring force of said barrier drive spring progressively increases in accordance with the movement of said barrier drive member,
wherein as said barrier blade is caused to perform the opening operation, in a state in which said barrier drive member is constrained from moving in a direction causing said barrier blade to move toward the opening position, the amount of the charged spring force of said barrier drive spring progressively increases in accordance with the opening operation of said barrier blade, and
wherein said barrier drive spring is implemented by a tension coil spring, and said barrier drive member moves between the closing position and the opening operation by rotation, and causes said barrier blade to perform opening and closing operations by being brought into contact with said barrier blade during the rotation to cause said barrier blade to rotate in accordance with the rotation.

2. A lens barrel as claimed in claim 1, wherein said barrier blade comprises a pair of barrier blades, and said barrier drive spring comprises a pair of barrier drive springs provided in association with said barrier blades, respectively.

3. A lens barrel as claimed in claim 1, wherein when a distance from a rotational axis of said barrier drive member to a position of contact between said barrier drive member and said barrier blade is represented by L1, a distance from the rotational axis of said barrier drive member to a point of force application of said barrier drive spring on said barrier drive member is represented by L2, and a distance from a pivotal axis of said barrier blade to the position of contact between said barrier blade and said barrier drive member is represented by L3, and a distance from the rotational axis of said barrier blade to a point of force application of said barrier drive spring on said barrier blade is represented by L4, a relationship of L2×L3>L1×L4 is satisfied.

4. A lens barrel, comprising:
a barrier blade configured to open and close over a photographic aperture;
a barrier drive member configured to move between a closing position for causing said barrier blade to close the photographic aperture and an opening position for causing said barrier blade to open the photographic aperture, thereby driving said barrier blade between a standby position for covering the photographic aperture and an image-taking position for opening the photographic aperture; and
a barrier drive spring, an amount of a charged spring force of which varies in accordance with the opening/closing operation of said barrier blade,
wherein, as said barrier drive member moves from the closing position to the opening position to cause said barrier blade to perform an opening operation, the amount of the charged spring force of said barrier drive spring progressively decreases,
wherein as said barrier drive member is moved to the closing position, in a state in which said barrier blade is constrained from moving toward the closing position, the amount of the charged spring force of said barrier drive spring progressively increases in accordance with the movement of said barrier drive member,
wherein as said barrier blade is caused to perform the opening operation, in a state in which said barrier drive member is constrained from moving in a direction causing said barrier blade to move toward the opening position, the amount of the charged spring force of said barrier drive spring progressively increases in accordance with the opening operation of said barrier blade, and
wherein said barrier drive spring is implemented by a torsion spring, and said barrier drive member moves between the closing position and the opening position by rotation, and causes said barrier blade to perform opening and closing operations by being brought into contact with said barrier blade during the rotation to cause said barrier blade to rotate in accordance with the rotation.

5. A lens barrel as claimed in claim 4, wherein when a distance from a rotational axis of said barrier drive member to a position of contact between said barrier drive member and said barrier blade is represented by L1, a distance from the rotational axis of said barrier drive member to a point of force application of said barrier drive spring on said barrier drive member is represented by L2, and a distance from a pivotal axis of said barrier blade to the position of contact between said barrier blade and said barrier drive member is represented by L3, and a distance from the rotational axis of said barrier blade to a point of force application of said barrier drive spring on said barrier drive member is represented by L4, a relationship of L2×L3>L1×L4 is satisfied.

6. A lens barrel comprising:
- a barrier blade configured to open and close over a photographic aperture;
- a barrier drive member configured to move between a closing position for causing said barrier blade to close the photographic aperture and an opening position for causing said barrier blade to open the photographic aperture, thereby driving said barrier blade between a standby position for covering the photographic aperture and an image-taking position for opening the photographic aperture; and
- a barrier drive spring, an amount of a charged spring force of which varies in accordance with the opening/closing operation of said barrier blade, wherein, as said barrier drive member moves from the closing position to the opening position to cause said barrier blade to perform an opening operation, the amount of the charged spring force of said barrier drive spring progressively decreases, wherein as said barrier drive member is moved to the closing position, in a state in which said barrier blade is constrained from moving toward the closing position, the amount of the charged spring force of said barrier drive spring progressively increases in accordance with the movement of said barrier drive member, wherein as said barrier blade is caused to perform the opening operation, in a state in which said barrier drive member is constrained from moving in a direction causing said barrier blade to move toward the opening position, the amount of the charged spring force of said barrier drive spring progressively increases in accordance with the opening operation of said barrier blade, and wherein said barrier drive spring is implemented by a tension coil spring, and said barrier drive member moves between the closing position and the opening operation by rotation, and causes said barrier blade to perform opening and closing operations by being brought into contact with said barrier blade during the rotation to cause said barrier blade move linearly in accordance with the rotation.

7. A lens barrel as claimed in claim 6, wherein when a distance from a rotational axis of said barrier drive member to a position of contact between said barrier drive member and said barrier blade is represented by L1, and a distance from the rotational axis of said barrier drive member to a point of force application of said barrier drive spring on said barrier drive member is represented by L2, a relationship of L2>L1 is satisfied.

* * * * *